(12) United States Patent
Anderson et al.

(10) Patent No.: US 12,160,933 B2
(45) Date of Patent: *Dec. 3, 2024

(54) INTEGRATION OF A WI-FI ACCESS POINT WITH A CELLULAR RADIO UNIT

(71) Applicant: Cisco Technology, Inc., San Jose, CA (US)

(72) Inventors: Fred J. Anderson, Lakeville, OH (US); Anand Oswal, Pleasanton, CA (US); Rajesh S. Pazhyannur, Fremont, CA (US); Arun G. Khanna, Sunnyvale, CA (US); Paul Jeffrey Stager, Akron, OH (US); David Stuart Kloper, Rohnert Park, CA (US); Brian Hart, Sunnyvale, CA (US); Qing Zhao, Fremont, CA (US); Jie Cheng Jiang, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/460,403

(22) Filed: Sep. 1, 2023

(65) Prior Publication Data
US 2023/0413384 A1    Dec. 21, 2023

Related U.S. Application Data

(63) Continuation of application No. 17/805,347, filed on Jun. 3, 2022, now Pat. No. 11,785,670, which is a
(Continued)

(51) Int. Cl.
*H04W 88/10* (2009.01)
*H04W 72/0453* (2023.01)
(Continued)

(52) U.S. Cl.
CPC ....... *H04W 88/10* (2013.01); *H04W 72/0453* (2013.01); *H04W 84/042* (2013.01); *H04W 84/12* (2013.01)

(58) Field of Classification Search
CPC .......... H04W 72/0453; H04W 84/042; H04W 84/12; H04W 88/10
See application file for complete search history.

(56) References Cited

U.S. PATENT DOCUMENTS 9,603,192 B2   3/2017   Mohebbi
9,609,566 B2   3/2017   Himayat et al.
(Continued)

FOREIGN PATENT DOCUMENTS

WO   2019183919 A1   10/2019

*Primary Examiner* — Farid Seyedvosoghi
(74) *Attorney, Agent, or Firm* — Polsinelli P.C.

(57) ABSTRACT

Systems, methods, and computer-readable media for an integrated Wi-Fi Access Point and cellular network Radio Unit (RU) include a communication system interfacing with a wired network for communicating Wi-Fi traffic and cellular network traffic, the communication system integrating a Wi-Fi Access Point (AP) with a cellular network Radio Unit (RU). The Wi-Fi traffic and cellular network traffic can be processed in the communication system. The communication system can interface with at least one programmable Radio Frequency (RF) front end configured for wireless communication over one or more frequency bands for Wi-Fi traffic and one or more frequency bands for cellular network traffic (e.g., 5G, LTE, Wi-Fi).

20 Claims, 12 Drawing Sheets

Related U.S. Application Data continuation of application No. 16/845,696, filed on Apr. 10, 2020, now Pat. No. 11,357,005.

(60) Provisional application No. 62/912,818, filed on Oct. 9, 2019.

(51) Int. Cl.
*H04W 84/04* (2009.01)
*H04W 84/12* (2009.01)

(56) References Cited

U.S. PATENT DOCUMENTS

| | | |
|---|---|---|
| 10,349,384 B2 | 7/2019 | Barton et al. |
| 2002/0085516 A1* | 7/2002 | Bridgelall ............. H04W 36/04 |
| | | 370/329 |
| 2004/0008645 A1 | 1/2004 | Janevski et al. |
| 2013/0083783 A1* | 4/2013 | Gupta ............... H04W 28/0247 |
| | | 370/338 |
| 2016/0212755 A1* | 7/2016 | Cao ....................... H04L 45/245 |
| 2017/0156086 A1 | 6/2017 | Tomici et al. |
| 2019/0159176 A1* | 5/2019 | Barton .................. H04W 72/04 |

* cited by examiner

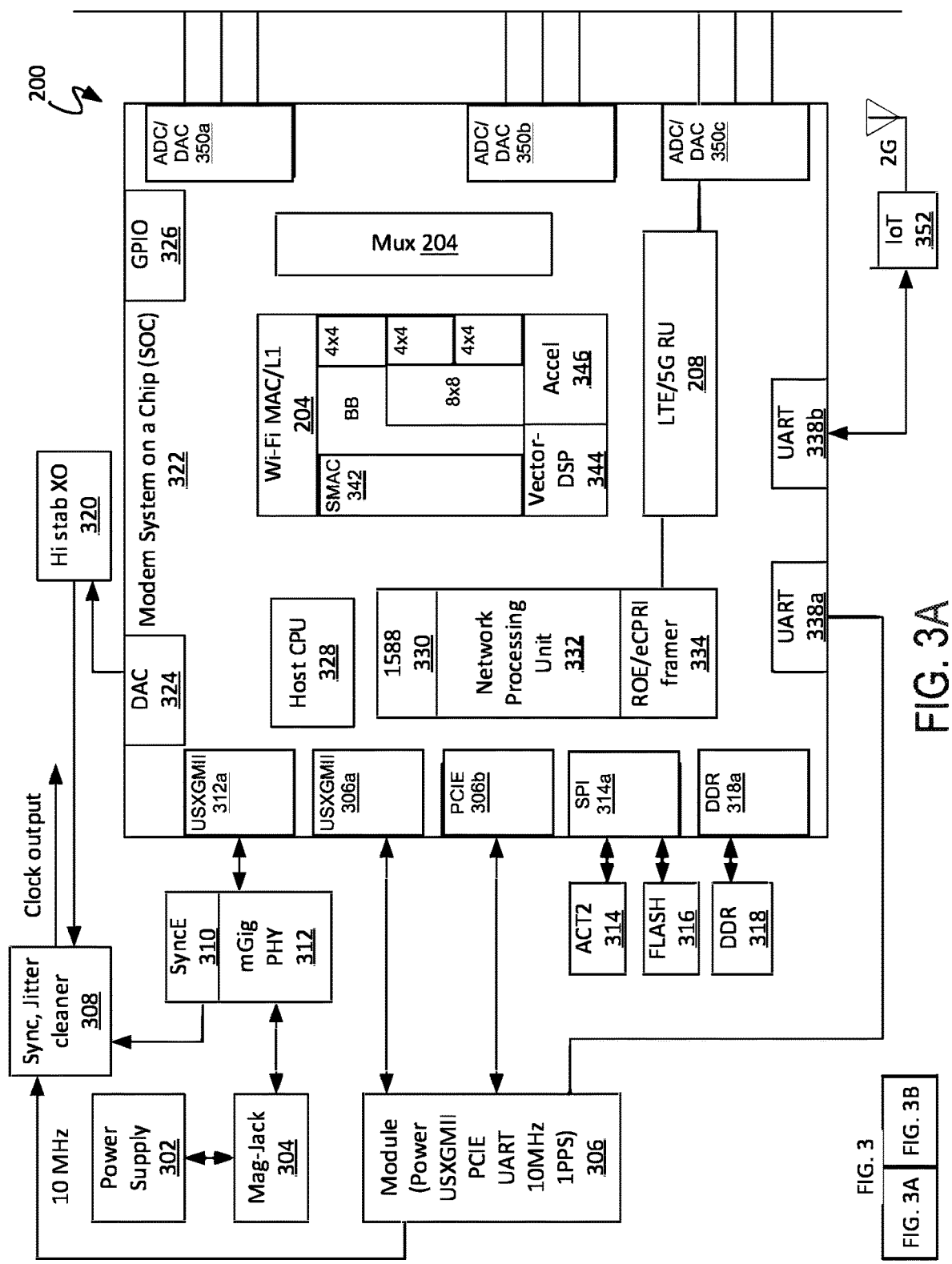

800

INTERFACE A COMMUNICATION SYSTEM WITH A WIRED NETWORK FOR COMMUNICATING WI-FI TRAFFIC AND CELLULAR NETWORK TRAFFIC, THE COMMUNICATION SYSTEM INTEGRATING A WI-FI ACCESS POINT (AP) WITH A CELLULAR NETWORK RADIO UNIT (RU)
802

PROCESS WI-FI TRAFFIC AND CELLULAR NETWORK TRAFFIC IN THE COMMUNICATION SYSTEM
804

INTERFACE THE COMMUNICATION SYSTEM WITH AT LEAST ONE PROGRAMMABLE RADIO FREQUENCY (RF) FRONT END CONFIGURED FOR WIRELESS COMMUNICATION OVER ONE OR MORE FREQUENCY BANDS FOR WI-FI TRAFFIC AND ONE OR MORE FREQUENCY BANDS FOR CELLULAR NETWORK TRAFFIC
806

FIG. 8

INTEGRATION OF A WI-FI ACCESS POINT WITH A CELLULAR RADIO UNIT

CROSS REFERENCE TO RELATED APPLICATIONS

This application is a continuation of U.S. application Ser. No. 17/805,347, filed on Jun. 3, 2022, which in turn is a continuation of U.S. application Ser. No. 16/845,696, filed Apr. 10, 2020, now U.S. Pat. No. 11,357,005, which claims benefit of priority under U.S.C. 119(e) to U.S. Provisional Application Patent Application No. 62/912,818, filed on Oct. 9, 2019, the contents of which are incorporated herein by reference in their entirety.

TECHNICAL FIELD

The subject matter of this disclosure relates in general to the field of radio access networking, and more particularly to Wi-Fi, Long-Term Evolution (LTE), and 5G New Radio (NR) interworking with respect to radio access networking.

BACKGROUND

For the radio access network (RAN), part of the mobile telecommunication system implementing a radio access technology, which has evolved through the generations of mobile communications (1G through 5G), a base station is used to provide connectivity to a region or cell. Examples of types of RANs include cellular networks such as Long-Term Evolution (LTE)/4G and 5G New Radio (NR). For Wi-Fi, Access Points (hereafter abbreviated as APs) serve as connection points between wireless and wired networks or as the center point of a stand-alone wireless network. In large installations, wireless users within the radio range of an access point can roam throughout a facility while maintaining seamless, uninterrupted access to the network.

With an ever increasing usage of wireless data networks, there has been a movement towards using Wi-Fi/LTE heterogeneous networks for spectrum multiplexing as a way to alleviate the problem of spectrum scarcity.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 3A-B illustrate an implementation of the system architecture of FIG. 2, according to example aspects of the present disclosure;

FIG. 8 illustrates a process of implementing an integrated Wi-Fi AP with a cellular network (e.g., LTE/5G) RU functionality, according to example aspects of the present disclosure.

DETAILED DESCRIPTION

Figure 1:
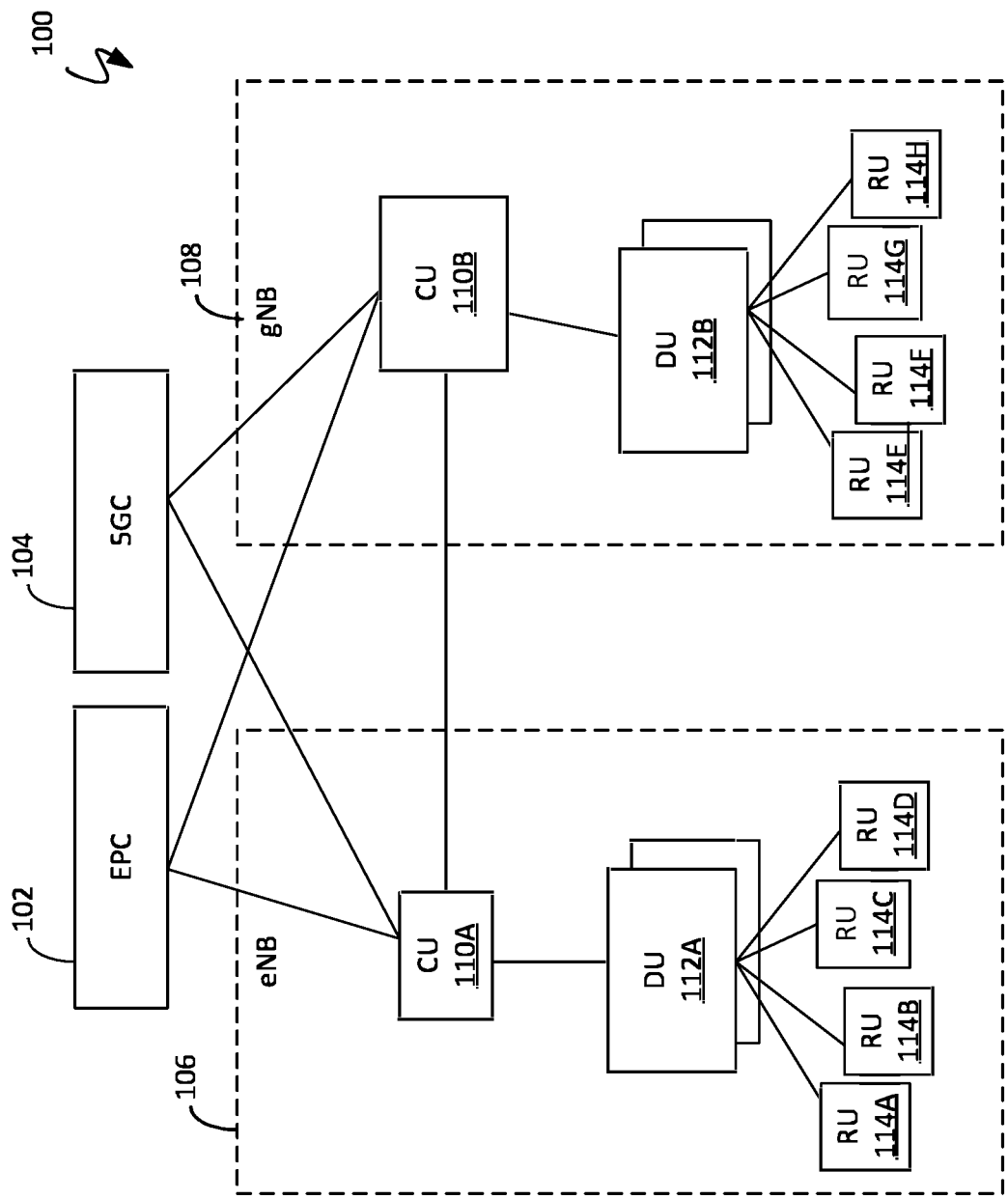
FIG. 1 illustrates a RAN architecture according to an example aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for an integrated Wi-Fi Access Point and cellular network Radio Unit (RU). A communication system can interface with a wired network such as Ethernet for communicating Wi-Fi traffic and cellular network traffic, the communication system integrating a Wi-Fi Access Point (AP) with a cellular network Radio Unit (RU). The Wi-Fi traffic and cellular network traffic can be processed in the communication system. The communication system can interface with at least one programmable Radio Frequency (RF) front end configured for wireless communication over one or more frequency bands for Wi-Fi traffic and one or more frequency bands for cellular network traffic (e.g., 5G, LTE, Wi-Fi).

In some examples, a method is provided. The method includes interfacing a communication system with a wired network for communicating Wi-Fi traffic and cellular network traffic, the communication system integrating a Wi-Fi Access Point (AP) with a cellular network Radio Unit (RU); processing Wi-Fi traffic and cellular network traffic in the communication system; and interfacing the communication system with at least one programmable Radio Frequency (RF) front end configured for wireless communication over one or more frequency bands for Wi-Fi traffic and one or more frequency bands for cellular network traffic.

In some examples, a system is provided. The system, comprises one or more processors; and a non-transitory computer-readable storage medium containing instructions which, when executed on the one or more processors, cause the one or more processors to perform operations including: interfacing a communication system with a wired network for communicating Wi-Fi traffic and cellular network traffic, the communication system integrating a Wi-Fi Access Point (AP) with a cellular network Radio Unit (RU); processing Wi-Fi traffic and cellular network traffic in the communication system; and interfacing the communication system with at least one programmable Radio Frequency (RF) front end configured for wireless communication over one or more frequency bands for Wi-Fi traffic and one or more frequency bands for cellular network traffic.

In some examples, a non-transitory machine-readable storage medium is provided, including instructions configured to cause a data processing apparatus to perform operations including: interfacing a communication system with a wired network for communicating Wi-Fi traffic and cellular network traffic, the communication system integrating a Wi-Fi Access Point (AP) with a cellular network Radio Unit (RU); processing Wi-Fi traffic and cellular network traffic in the communication system; and interfacing the communication system with at least one programmable Radio Frequency (RF) front end configured for wireless communication over one or more frequency bands for Wi-Fi traffic and one or more frequency bands for cellular network traffic.

In some examples, the communication system integrating the Wi-Fi AP with the cellular network RU comprises a system on a chip (SoC), the SoC comprising: a Wi-Fi Media Access Controller (MAC) for processing the Wi-Fi traffic; a cellular RU block for processing the cellular network traffic; and a traffic multiplexer in communication with the wired network, the traffic multiplexer for routing Wi-Fi traffic to the Wi-Fi MAC and cellular network traffic to the cellular RU block.

In some examples, the at least one programmable RF front end comprises a common programmable RF front end module for routing Wi-Fi traffic for wireless communication from the Wi-Fi MAC and cellular traffic for wireless communication from the cellular RU block.

In some examples, the communication system integrating the Wi-Fi AP with the cellular network RU comprises a cellular RU module for processing the cellular network traffic, the cellular RU module configured to be connected to the Wi-Fi AP through a module interface.

In some examples, the Wi-Fi AP further comprises: a Wi-Fi Media Access Controller (MAC) for processing the Wi-Fi traffic; and a traffic multiplexer for routing Wi-Fi traffic to the Wi-Fi MAC and cellular network traffic to the cellular RU module over the module interface.

In some examples, the Wi-Fi AP further comprises the at least one programmable RF front end, the at least one programmable RF front end being configured for routing Wi-Fi traffic for wireless communication from the Wi-Fi MAC and cellular traffic for wireless communication from the cellular RU module, and wherein the cellular RU module further comprises a cellular RF front end for routing cellular traffic for wireless communication from the cellular RU module.

In some examples, the Wi-Fi AP further comprises one or more registers for storing timestamps associated with an IEEE 1588 Precision Timing Protocol (PTP), the cellular RU module comprises a precision oscillator, synchronizing the precision oscillator to the IEEE 1588 PTP is based on one or more trigger or synchronization signals provided across the module interface for accessing the one or more registers.

In some examples, the communication system integrating the Wi-Fi AP with the cellular network RU comprises a system on a chip (SoC), the SoC integrating a Wi-Fi Media Access Controller (MAC) for processing the Wi-Fi traffic with a cellular RU Media Access Controller (MAC) for processing the cellular network traffic.

In some examples, the cellular network traffic comprises one or more of 4G, Long Term Evolution (LTE), or 5G New Radio (NR) traffic.

This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim. The foregoing, together with other features and embodiments, will become more apparent upon referring to the following specification, claims, and accompanying drawings.

DESCRIPTION OF EXAMPLE EMBODIMENTS

FIG. 1 illustrates a high level architecture of a radio access network (RAN) configured to provide cellular network radio access for 5G/NR and LTE/4G, among others. A RAN node (or base station/access point) can include a 4G Evolved Packet Core (EPC) 102 and/or a 5G Core (5GC) 104. The EPC 102 can include an LTE radio base station (evolved Node B or eNB) 106 and the 5GC 104 can include a 5G NR radio base station (gNB) 108. The eNB 106 and the gNB 108 can be connected to each other through Xn, NG, or other interfaces. The eNB 106 and the gNB 108 can each incorporate three main functional modules: a Centralized Unit (CU) 110 (including 110A and 110B), one or more Distributed Units (DUs) 112 (including 112A and 112B), and one or more Radio Units (RUs) 114 (including 114A-H, as shown), which can be deployed in multiple combinations.

The primary interface between the CU 110 and the DU 112 is an F1 interface which may be interoperable across vendors. The CU 110 can be further disaggregated into a CU user plane (CU-UP) and a CU control plane (CU-CP), both of which connect to the DU 112 over F1-U and F1-C interfaces respectively. The RAN architecture 100 is a logical architecture that can be implemented and deployed in different ways, according to an operator's requirements and preferences. For example, the base stations eNB 106 and/or gNB 108 can be deployed as monolithic units at the cell site, as in classic cellular networks, or split between the CU 110, DU 112, and the RU 114.

The CU-DU interface is a higher-layer split (HLS), which is more tolerant to delay. The DU-RU is a lower-layer split (LLS), which is more latency-sensitive and demanding on bandwidth, but may offer improved radio performance across a coverage area due to coordination gain. For example, the LTE/5G supports a 7.2 split, which refers to splits between the DUs 112 and the RUs 114. The CUs 110, DUs 112, and RUs 114 can be deployed at locations such as cell sites (including towers, rooftops and associated cabinets and shelters), transport aggregation sites and edge sites (e.g., central offices or local exchange sites).

With improvements in speed, latency, and higher density of connected devices, Wi-Fi continues to offer desirable wireless connectivity in various indoor environments, enterprise networks, etc. For example, Wi-Fi access points can serve users in offices, stadiums, concert halls, convention centers, etc. In modern implementations, RAN deployments for cellular networks (e.g., 5G, LTE) and Wi-Fi (e.g., Wi-Fi 6) can share common infrastructure and co-exist to support different use cases. Since they are complementary technologies, they can provide higher data rates to support new applications and increases in network capacity with the ability to connect more devices wirelessly. Wi-Fi and 5G/LTE integration can offer enhanced mobile broadband for mission-critical IoT devices being used in manufacturing automation, healthcare, energy, and many other industries, provide immersive experience via augmented and virtual reality, benefit industries such as hospitality, retail, education, among others.

Both centralized and distributed implementation of RAN functions can be support various RAN deployments, including integration of cellular (e.g., LTE/5G NR) capabilities with Wi-Fi. For example, the CU and DU functionalities of a Wi-Fi AP can be integrated with a 5G capable RU. Such integration can use software-designed radio-based baseband to support Wi-Fi, LTE, and 5G-NR simultaneously.

It is recognized that there are opportunities for sharing hardware and functional blocks between the Wi-Fi AP and the 5G RU to improve resource utilization. For example, in the case of integration with a Wi-Fi AP, a 5G/LTE RU may be configured as edge device, where the RU may connect to the network through a DU. In some implementations, the Wi-Fi AP can include a network device which can receive Ethernet packets and transmit them over-the-air using Wi-Fi, for example. While the RU may include antennas, over-the-air transponders, and other hardware for wireless communication, the signals from the RU are transmitted through the DU, where the signals from the RU may not include Ethernet packets but include bit streams/high volume RF samples. The Wi-Fi AP can be designed as a customized System on a Chip (SoC) which can include functional blocks that can be utilized for functionality of the RU, as well as being able to rely on functional blocks of the RU and eliminate redundancy in the SoC. The various examples below describe integration of a 5G RU and a Wi-Fi AP.

Figure 2:
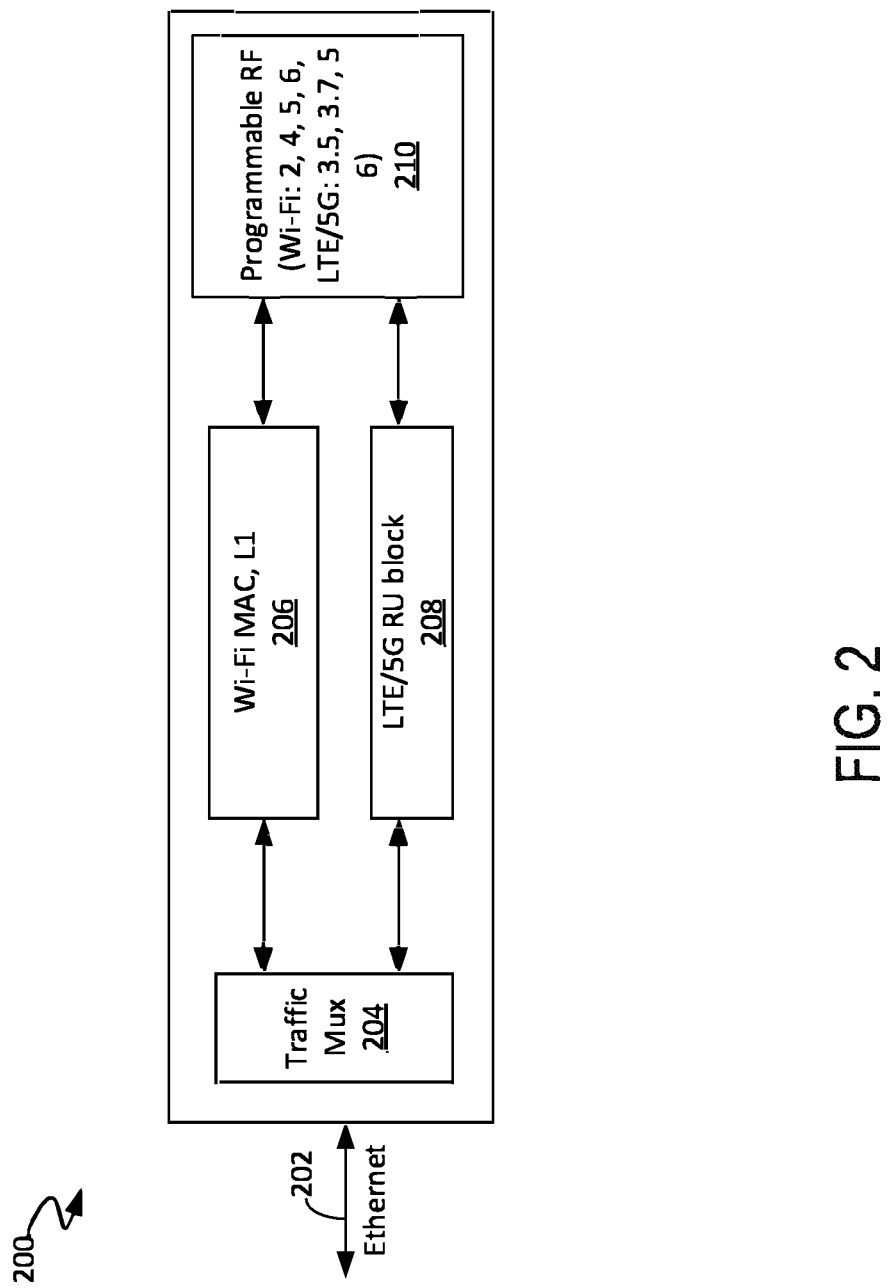
FIG. 2 illustrates a high level system architecture of an integrated Wi-Fi Access Point (AP) with a cellular network (e.g., LTE/5G) Remote Unit (RU) for use in a RAN architecture, according to example aspects of the present disclosure.

FIG. 2 illustrates a high level overview of a system architecture for a Wi-Fi AP 200 with an integrated RU component, according to an example aspect of the present disclosure. The Wi-Fi AP 200 can include a CU, DU, and RU and have a software-designed radio-based baseband that can support Wi-Fi, and cellular network traffic (e.g., LTE and 5G-NR) simultaneously. In some examples, the CU/DU functions can be included in a Wi-Fi host while the RU may support 5G/LTE. For example, the Wi-Fi AP 200 can include a Wi-Fi Media Access Controller (MAC) 206 implemented as a Layer 1 or physical (PHY) layer device and support a 7.2 split where the LTE and NR functions are supported by the LTE/5G RU 208. The RU 208 can implement functions such as inverse fast Fourier Transform (IFFT), cyclic prefix (CP) addition, interpolation, digital predistortion (DPD) (e.g., in the downlink) and correspondingly reverse operations for the uplink. The Wi-Fi AP 200 can further include a programmable RF Front End 210 configured for Wi-Fi channels (e.g., 2.4, 5, 6 GHz) and including support for LTE channels (e.g., mid-bands (sub 6 GHz) for LTE and NR including time division duplex (TDD) and frequency division duplex (FDD)). The Wi-Fi AP 200 may be configured to handle Ethernet traffic, including managing Wi-Fi traffic and LTE/NR front haul traffic in a manner which ensures latency and bandwidth requirements for RU traffic using a Wi-Fi AP.

For example, the Wi-Fi AP 200, can be connected to a wired router, switch, or hub via an Ethernet cable 202, and communicate with devices within a service area wirelessly using Wi-Fi technology. The Wi-Fi MAC 206 can include a Wi-Fi host processor, as will be explained with reference to FIGS. 3A-B. A traffic multiplexer (Mux) 204 can channel Wi-Fi traffic to the Wi-Fi MAC 206, while routing LTE/5G traffic to a LTE/5G RU block 208 for handling the LTE/5G traffic. For Wi-Fi, the integrated Wi-Fi AP 200 may receive signals from the Internet via the Ethernet cable 202. The LTE/5G RU block 208 may be integrated in the integrated Wi-Fi AP 200 and the rest of the LTE/5G node, such as the DU and CU, may transmit signals with the LTE/5G RU block 208 through the programmable RF 210 as well.

Figure 3B:
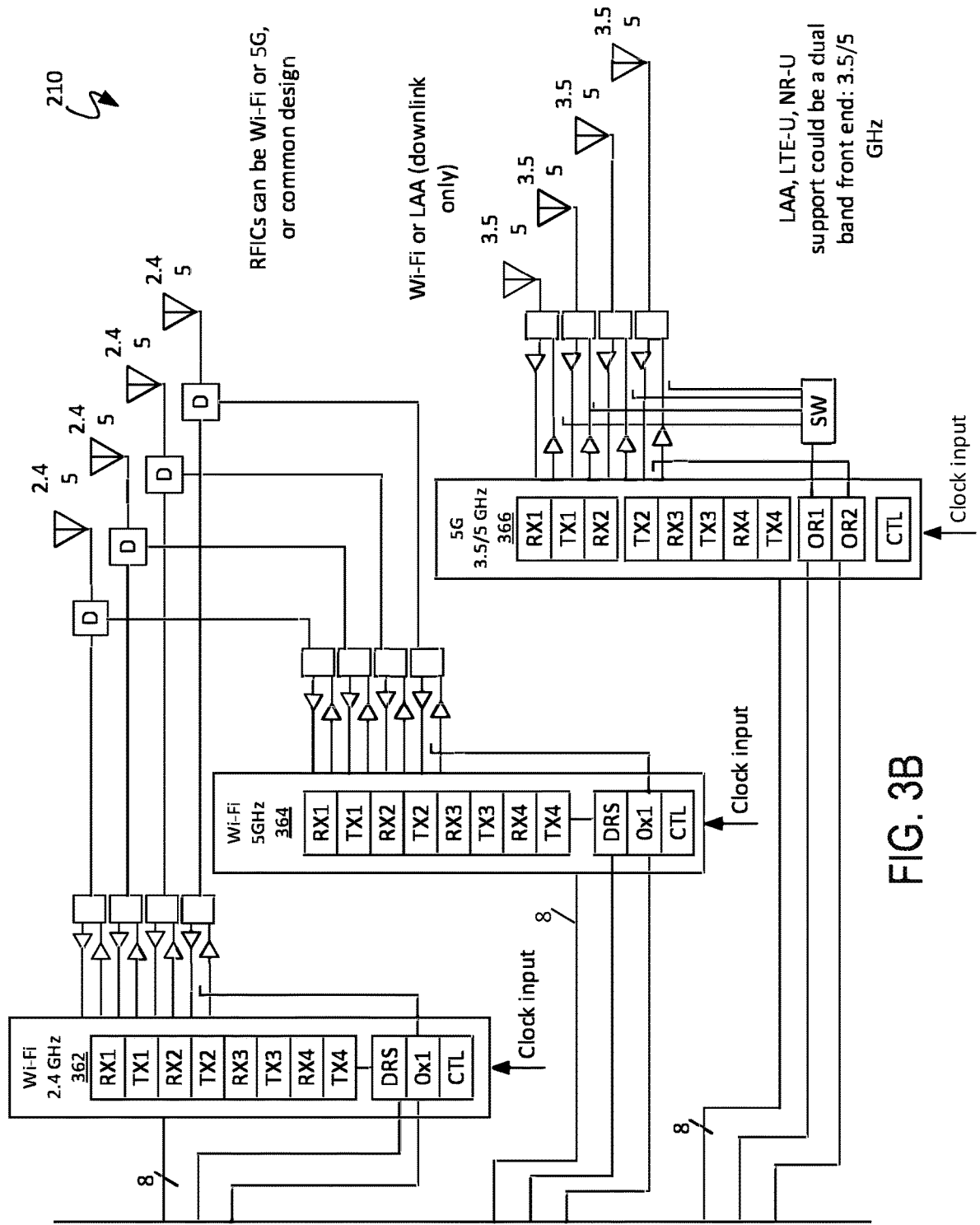

FIGS. 3A-B illustrate an example implementation of the architecture of Wi-Fi AP 200 described with reference to FIG. 2. Referring to FIG. 3A, the Wi-Fi MAC 206 and the LTE/5G RU 208 can be implemented on a modem SoC 322. The Wi-Fi MAC 206 may also be coupled with a Simple MAC (SMAC) 342, a vector Digital Signal Processor (DSP) 344, and a hardware accelerator 346 for improving performance of customized functions used in the Wi-Fi processing. The mux 204 for routing traffic to the Wi-Fi MAC 206 and the LTE/5G RU 208 can be integrated in the SoC 322. The LTE/5G RU can support 7.2 5G bit processing, Digital Down Converter (DDC), Fast Fourier Transform (FFT)/Inverse FFT (IFFT), compression, physical random access channel (PRACH), etc.

The SoC 322 can include various other components such as a host central processing unit (CPU) 328 which can be shared between the Wi-Fi MAC 206 and the LTE/5G RU 208. A timing synchronization module such as an IEEE 1588 Precision Timing Protocol (PTP) 330 can be used for synchronizing the clock for the SoC 322. A network processing unit 332 and a Radio over Ethernet Framer (RoE)/Ethernet Common Public Radio Interface (eCPRI) Framer 334 can be used for the processing of Ethernet packets. The integrated design allows improved hardware resource utilization as seen in the example implementation of the SoC 322.

The SoC 322 can also include various other components such as a digital to analog converter (DAC) 324 connected to an crystal oscillator XO such as a hi stab XO 320, general-purpose input/output (GPIO) 326 ports or pins, analog to digital converter (ADC)/DACs 350*a-c* to connect to the programmable RF 210 (shown in FIG. 3B), interfaces such as Universal Serial 10GE Media Independent Interfaces (USXGMII) 312*a*, 306*a*, peripheral component interconnect express (PCIE) 306*b*, Serial Peripheral Interface (SPI) 314*a*, Universal Asynchronous Receiver/Transmitter (UART) 338*a-b*, a Double Data Rate (DDR) memory port 318*a*, among others. The interfaces can be connected as shown to a synchronous Ethernet (syncE) 310, multi gigabit physical layer device (mGig PHY) 312, an Anti-Counterfeit Technology, $2^{nd}$ Generation (ACT2), a FLASH memory 316, a DDR memory 318, a module 306 supporting the various interfaces), one or more Internet of Things (IoT) devices 352, etc. A power supply 302, an Ethernet jack such as mag-jack 304, and a synchronization/jitter cleaning module 308 for clock outputs can also be connected as shown.

Referring to FIG. 3B, the programmable RF 210 front end module can include the transmitters, receivers, control, clock inputs, antennas, and other Radio Frequency (RF) Integrated Circuit (IC) or RFIC components for Wi-Fi as well as LTE, NR, etc. For example, a module 362 of the programmable RF 210 can support Wi-Fi channels (e.g., 2.4 GHz), a module 364 can support Wi-Fi channels (e.g., 5 GHz), and a module 366 can support 5G channels (e.g., 3.5 GHz).

Figure 4:
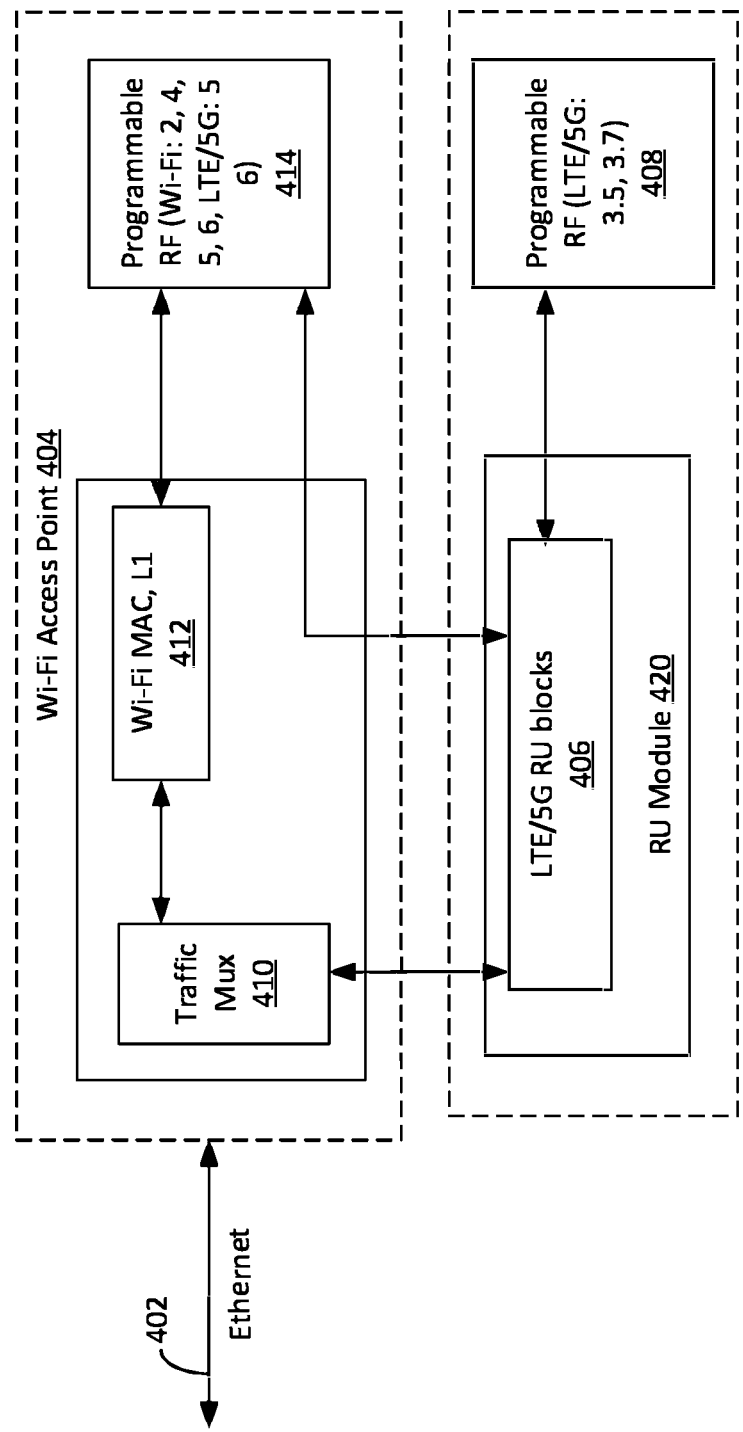
FIG. 4 illustrates a high level system architecture of a Wi-Fi AP with a cellular network (e.g., LTE/5G) RU as a separate but attachable module for use in a RAN architecture, according to example aspects of the present disclosure.

FIG. 4 illustrates a high level overview of a system architecture an alternative system 400, which includes an alternative to the Wi-Fi AP 200 discussed with reference to FIGS. 2, 3A-B. System 400 includes a Wi-Fi AP 404 and an RU module 420 comprising LTE/5G RU blocks 406. The RU module 420 may be a separate module which can be flexibly connected to the Wi-Fi AP 404.

In the system 400, the Wi-Fi AP 404 can receive Ethernet traffic from the Ethernet 402 and include the traffic mux 410 for directing front haul LTE/NR to the RU module 420 and Wi-Fi traffic to the Wi-Fi MAC 412 implemented in the Wi-Fi AP 404. Latency and bandwidth requirements for the RU traffic and the Wi-Fi traffic can be handled using synchronization protocols such as the 1588 PTP, where FIG. 5B provides additional details on the timing synchronization with the RU module 420. Some traffic from the RU module 420 can be routed through the Wi-Fi AP 404. For example, the Wi-Fi AP can include a programmable RF 414 for supporting Wi-Fi (e.g., 2.4, 5, 6 GHz) as well as 5G (e.g., 5, 6 GHz) traffic. Further, the RU module 404 can also direct 5G traffic through another programmable RF (e.g., LTE/5G traffic at 3.5, 3.7 GHz).

Figure 5A:
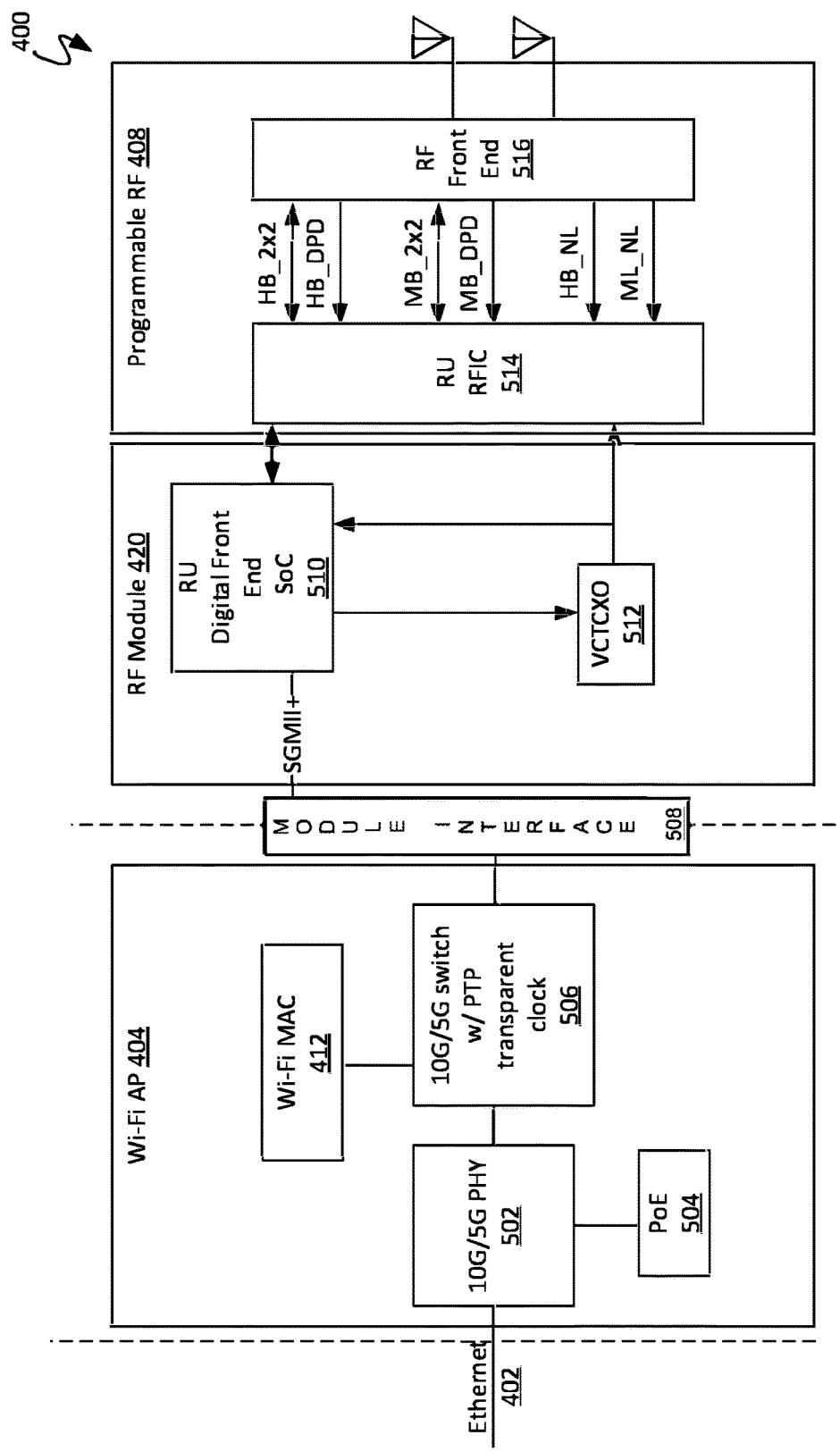
FIGS. 5A-B illustrate aspects of implementing the system architecture of FIG. 4, according to example aspects of the present disclosure.
Figure 5B:
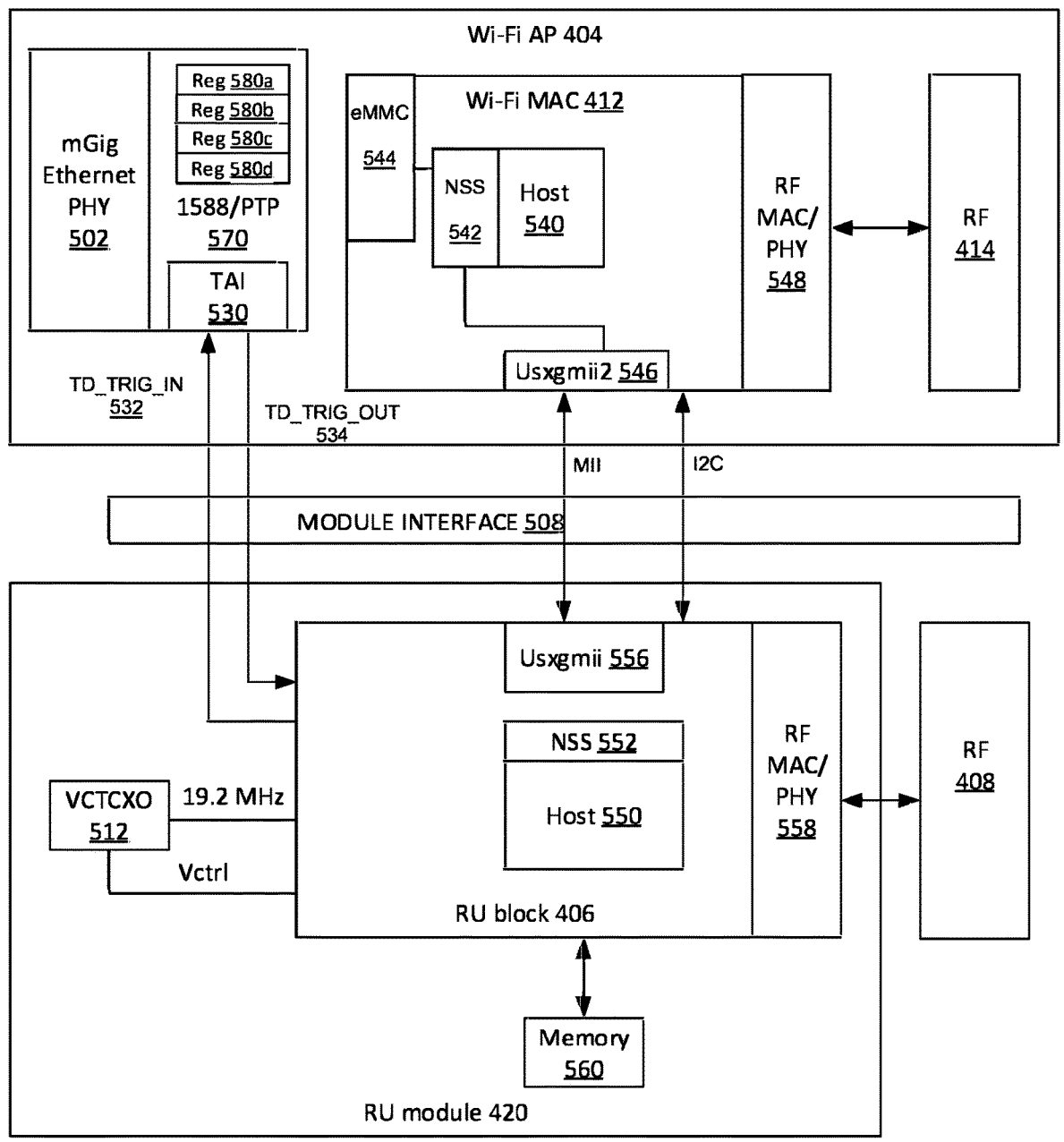

FIGS. 5A-B illustrate example implementations of the architecture of the system 400 described with reference to FIG. 4. Referring to FIG. 4A, additional details of the Wi-Fi AP 404, RF module 420, and the programmable RF 408 are shown. For example, the Wi-Fi AP 404 can include an SoC for the Wi-Fi MAC, a 10G/5G PHY 502 connected to the Ethernet 402 (or Local Area Network (LAN), and a Power over Ethernet (PoE) 504, and a 10G/5G switch 506 implementing a PTP transparent clock. The clock can be supplied through the module interface 508 to the RF module 420. The RF module 420 can include an RU digital front end SoC 510 connected to an oscillator VCTCXO 512 which is synchronized with the PTP clock in Wi-Fi AP 404 as described with reference to FIG. 5B. The RF module 420 can be connected to the programmable RF 408 (the programmable RF 414 connected to the Wi-Fi AP 404 of FIG. 4 is not shown in this view). The programmable RF 408 can include various RFICs and other modules for LTE/5G traffic, including, for example, the RU RFIC 514, the RF front end 516, among others.

FIG. 5B illustrates aspects of timing synchronization between the Wi-Fi MAC 412 and the RU module 420. The module interface 508 is shown between the Wi-Fi AP 404 and the RU module 420. The Wi-Fi MAC 412 can be implemented as an SoC with various components including an embedded Multi-Media Controller (eMNIC 544), a network processor 542, a host processor 540, and a usxgmii 546. A 1588/PTP module is shown connected to an mGig Ethernet PHY 502. The Wi-Fi MAC 412 can connect to the programmable RF 414 through a RF MAC PHY 548.

The RU module 420 is shown to include an RU block 406 connected to the programmable RF 408 through the RF MAC/PHY 558. The RU block 406 includes a usgxmii 556 interface, a host processor 550 and a network processor 552. The RU module 420 includes a precision oscillator such as VTCXO 512.

The 1588/PTP module 570 in the Wi-Fi AP 404 can implement IEEE 1588 PTP using a state machine approach to time extraction, which can include hardware such as a time-stamper and a software protocol stack (PS). The time-stamper hardware can be implemented in real time, to be synchronized with a local clocking mechanism. The time stamper may be located inside or in close proximity to the Ethernet PHY such as the Ethernet PHY 502. The time-stamper can store specific timestamps in the registers 580a-d or other storage.

The 1588 PS can mathematically determine absolute time of day (ToD) from the payloads of time stamp packets exchanged to and from a master such as a PTP master (e.g., a satellite clock). These payloads (e.g., timestamps located in the registers 580a-d) can be read and written by the PS as required, with the PS processes such as the reads, writes, and PS calculations being performed according to resource availability (e.g., a general purpose processor (GPU) or CPU) on a host. For example, the PS processes may not be time-critical, and may be performed as needed.

However, even though the software PS processes are not time-critical, the hardware trigger/synchronization I/O signals are time critical and required to be presented to the GPU running the PS algorithms for use by SW based counters. Propagation delays on these signals can lead to inaccuracies and incorrect synchronization.

In traditional implementations (such as 4G/5G small cells needing precise oscillator disciplining), these real-time trigger/synchronization signals are connected only to a local GPU which also implement servo loops to discipline the precision oscillator. For example, the hardware and software elements are implemented in the same processor system located in close proximity to the Ethernet PHY minimize or eliminate propagation errors which can be caused by the signaling.

As can be appreciated, the expansion modules to APs, such as the RU module 420 connectable to the Wi-Fi AP 404, can face synchronization challenges when the precision oscillator and the hardware/software elements for 1588 PS may be implemented on separate modules/processing systems separated by the module interface 508, for example. A similar consideration is also applicable in cases where an AP (not necessarily a Wi-Fi AP) supports an expansion module such as 4G/5G small cells or Remote Radio Heads (RRHs)/RUs. The 3GPP requires a precision oscillator which must be disciplined within 1.5 microsecond phase synchronization and 100 ppb absolute frequency accuracy, which can be expensive. For example, the expansion modules are required to synchronize their oscillators and Time of Day via the 1588 interface, but the 1588 time stamping is implemented on the AP platform such as in the Wi-Fi AP 404 as shown.

It is desirable to implement the expensive oscillators in the RU/expansion modules but not add a redundant oscillator in the base AP platform to conserve resources and costs. Accordingly, example aspects include techniques for remotely utilizing and controlling the Ethernet PHY through a host forwarding path which includes the signals 532, 534, and the module interface 508.

In the split architecture of FIGS. 4, 5A-B for the system 400, a GPU or the host processor 550 on the RU module 420 can be configured to implement the PS, and accordingly, timing critical signals can be provided from the PHY Timing Application Interface (TAI) 520 to the host 550. The TD_TRIG_IN 532 and TD_TRIG_OUT 534 are examples of trigger/synchronization signals connected through the module interface 508 to RU module 420. The GPU can implement read/writes capability to the PHY registers and these operations are not time-critical. Since these latency tolerant 1588 PS operations and the VCTCXO512 servo loop can be implemented in the RU module host and the time stamping triggers are hardware coupled across the module interface, the problem is solved.

Figure 6:
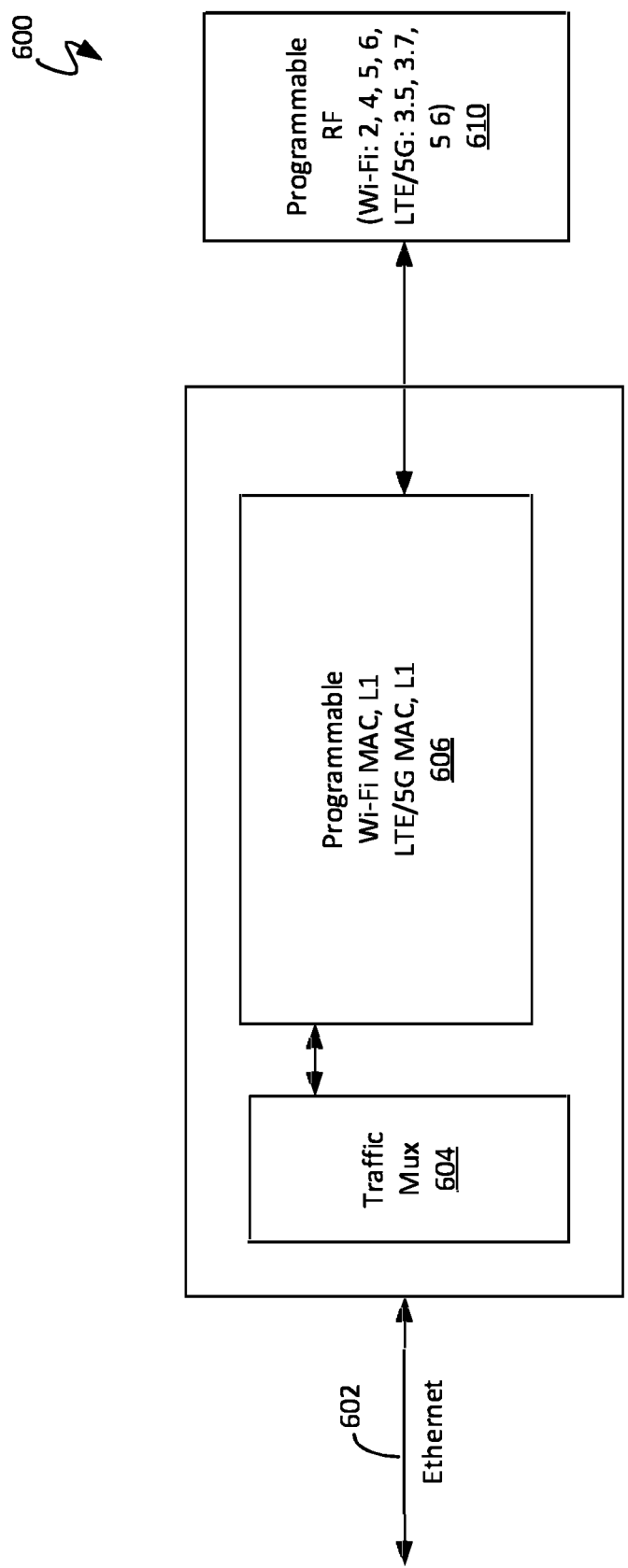
FIG. 6 illustrates a high level system architecture of an integrated Wi-Fi AP with cellular network (e.g., LTE/5G) Small Cell for use in a RAN architecture, according to example aspects of the present disclosure.

FIG. 6 illustrates a high level overview of a system architecture for a system 600 with a programmable Wi-Fi and LTE/5G MAC 606 which integrates an RU MAC and a Wi-Fi MAC on an the same SoC. The system 600 can implement an integrated Wi-Fi and LTE/5G Small Cell, having a software-designed radio-based baseband that can support Wi-Fi, LTE, 5G-NR simultaneously. The system 600 can also include a soft MAC (SMAC), e.g., with ARM cores supporting a programmable number of Wi-Fi cells and LTE and 5G-NR cells (with varying carrier aggregation). The system 600 can connect to the Ethernet 602 through a traffic mux 604 and be connected to a programmable RF 610 Front End configured for various bands such as 2.4, 5, 6 GHz for Wi-Fi and mid-bands (sub 6 GHz) for LTE and NE including TDD and FDD.

Figure 7A:
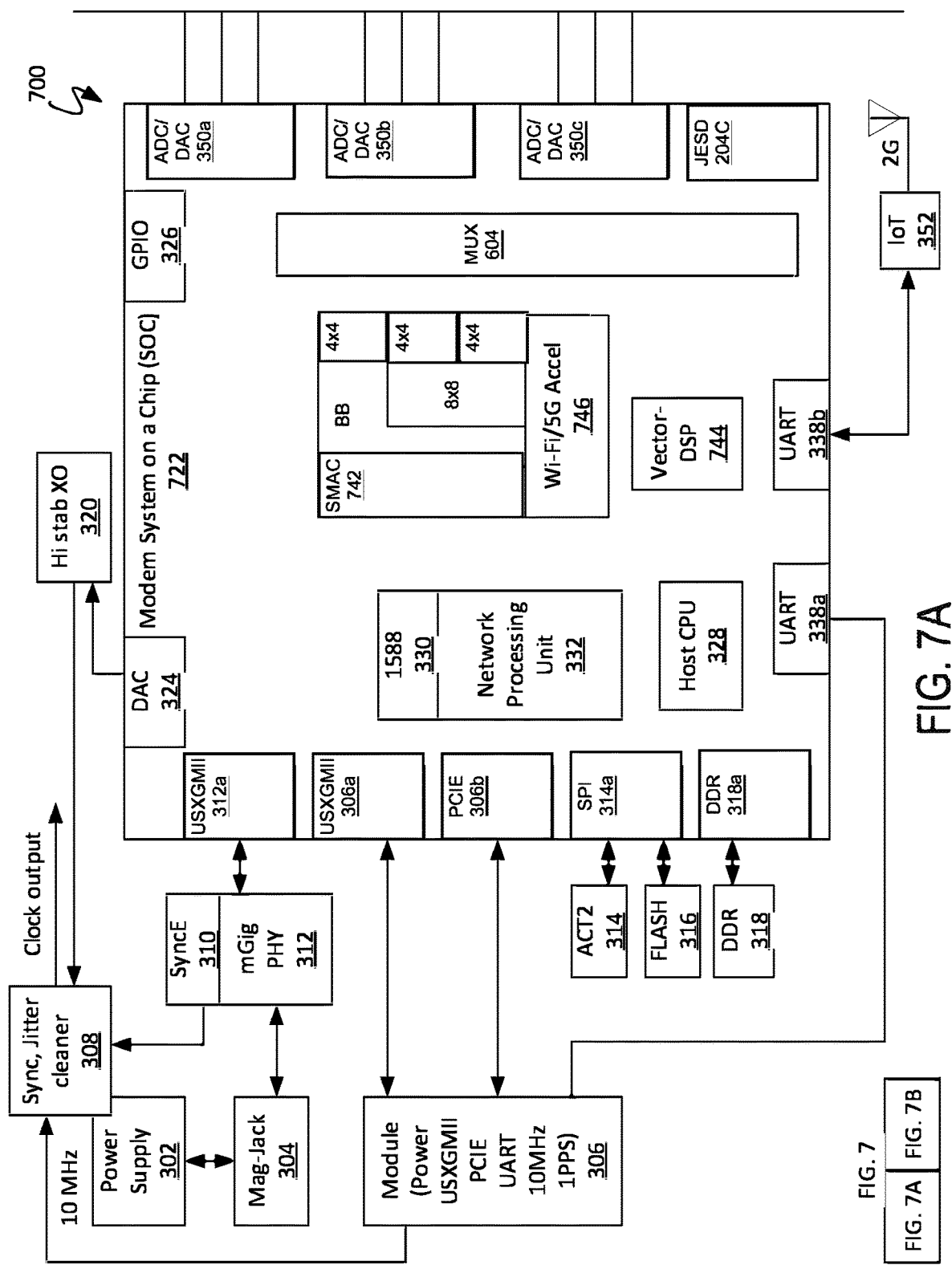
FIGS. 7A-B illustrate an implementation of the system architecture of FIG. 2, according to example aspects of the present disclosure.
Figure 7B:
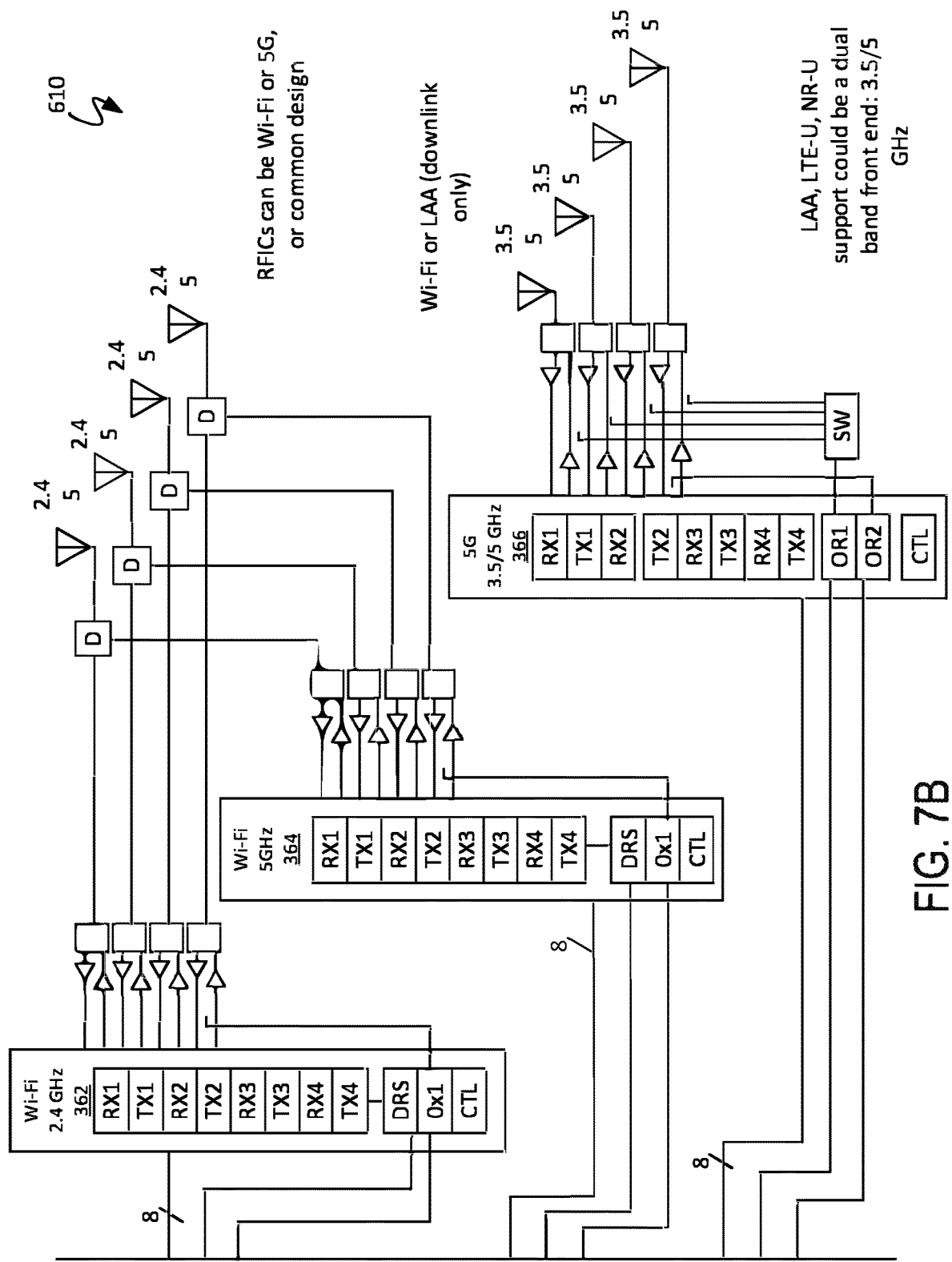

FIGS. 7A-B illustrate an example implementation of the architecture of the system 600 described with reference to FIG. 6. In FIGS. 7A-B, like reference numerals have been used to designate components with similar functionality as those described with reference to FIGS. 3A-B. Therefore, an exhaustive description of like components will be avoided for the sake of brevity, while the focus of the description herein will be on the components which are specific to FIGS. 7A-B. For example, in FIG. 7A, the modem SoC 722 is shown to implement the functionality of both the RU MAC and the Wi-Fi MAC. The SMAC 742 and the Wi-Fi/5G accelerator 746 can be designed to implement the shared functions of both the 5G/LTE RU as well as the Wi-Fi AP in a tightly integrated and customized approach which can be cost effective and reuse resources. The mux 604 can route the 5G/LTE as well as Wi-Fi traffic to the integrated Wi-Fi and RU MAC. In some examples, the vector DSP 744 can be provided as a separate component to enable the functions of the Wi-Fi and RU MAC to be implemented as shown. For example, the vector DSP 744 can support signal processing functions, FFT/IFFT common filtering, rotations, windowing, equalization, steering, demapping/mapping, etc., which may be common to both Wi-Fi and cellular traffic. Encoding and decoding functions can be different but can be supported by customized hardware accelerators 746, for example. Like in FIG. 3B, the programmable RF 610 can also include various RFICs to support Wi-Fi and 5G/LTE traffic on different channels such as 2.4, 5, 3.5 GHz, etc.

In system 600, the CU, DU, and RU functionality can be integrated into a small cell, which is then integrated into a Wi-Fi AP. In some examples, the RU and DU functionalities can be integrated with CU functionalities. The system 600 can provide a single platform to support multiple protocols (including Wi-Fi and LTE/5G). In the example implementations, system 600 can conserve power, bandwidth, resources (e.g., number of antennas) based on resource sharing.

Having described example systems and concepts, the disclosure now turns to the process 800 illustrated in FIG. 8. The blocks outlined herein are examples and can be implemented in any combination thereof, including combinations that exclude, add, or modify certain steps.

At the block 802, the process 800 includes interfacing a communication system with a wired network for communicating Wi-Fi traffic and cellular network traffic, the communication system integrating a Wi-Fi Access Point (AP) with a cellular network Radio Unit (RU). For example, the communication system can include Wi-Fi AP 200, the system 400, or the system 600 as described above can integrate respective Wi-Fi APs with a 5G/LTE RU and communicate over a wired network such as the Ethernet 202, 402, or 602.

At the block 804, the process 800 includes processing Wi-Fi traffic and cellular network traffic in the communication system. For example, the Wi-Fi AP can process the Wi-Fi traffic and the cellular network RU can process the cellular network traffic.

At the block 806, the process 800 includes interfacing the communication system with at least one programmable Radio Frequency (RF) front end configured for wireless communication over one or more frequency bands for Wi-Fi traffic and one or more frequency bands for cellular network traffic. For example, the programmable RF 210 of FIG. 2, the programmable RF 414 of FIG. 4, or the programmable RF 610 of FIG. 6 can include the at least one programmable RF front end configured for wireless communication over one or more frequency bands for Wi-Fi traffic and one or more frequency bands for cellular network traffic as discussed above.

For example, as discussed with reference to FIGS. 2 and 3A-B, the communication system integrating the Wi-Fi AP with the cellular network RU can include a system on a chip (SoC) 322, the SoC comprising a Wi-Fi Media Access Controller (MAC) 204 for processing the Wi-Fi traffic, a cellular RU block 208 for processing the cellular network traffic, and a traffic multiplexer 204 in communication with the wired network (e.g., Ethernet 202), the traffic multiplexer for routing Wi-Fi traffic to the Wi-Fi MAC 204 and cellular network traffic to the cellular RU block 208. The at least one programmable RF front end comprises a common programmable RF front end module 210 with RFICs 362, 364, 366 for routing Wi-Fi traffic for wireless communication from the Wi-Fi MAC 204 and cellular traffic for wireless communication from the cellular RU block 208.

In the examples discussed with reference to FIGS. 4 and 5A-B, the communication system 400 integrating the Wi-Fi AP with the cellular network RU comprises a Wi-Fi AP 404 and a cellular RU module 420 for processing the cellular network traffic, the cellular RU module 420 configured to be connected to the Wi-Fi AP 404 through a module interface 508. The Wi-Fi AP further comprises the Wi-Fi Media Access Controller (MAC) 412 for processing the Wi-Fi traffic, and a traffic multiplexer 410 for routing Wi-Fi traffic to the Wi-Fi MAC 412 and cellular network traffic to the cellular RU module 420 over the module interface 508. The Wi-Fi AP 404 further comprises the at least one programmable RF front end 414, the at least one programmable RF front end 414 being configured for routing Wi-Fi traffic for wireless communication from the Wi-Fi MAC 412 and cellular traffic for wireless communication from the cellular RU module 420, and wherein the cellular RU module 420 further comprises a cellular RF front end 408 for routing cellular traffic for wireless communication from the cellular RU module 420.

In the system 400, Wi-Fi AP further comprises one or more registers 580a-d for storing timestamps associated with an IEEE 1588 Precision Timing Protocol (PTP) 570, the cellular RU module 420 comprises a precision oscillator 512, synchronizing the precision oscillator 512 to the IEEE 1588 PTP is based on one or more trigger or synchronization signals 532-534 provided across the module interface 508 for accessing the one or more registers 580a-d.

In some examples, discussed with reference to FIGS. 6 and 7A-B, the communication system 600 integrating the Wi-Fi AP with the cellular network RU comprises a system on a chip (SoC) 722, the SoC 722 integrating a Wi-Fi Media Access Controller (MAC) for processing the Wi-Fi traffic with a cellular RU Media Access Controller (MAC) for processing the cellular network traffic.

Figure 9A:
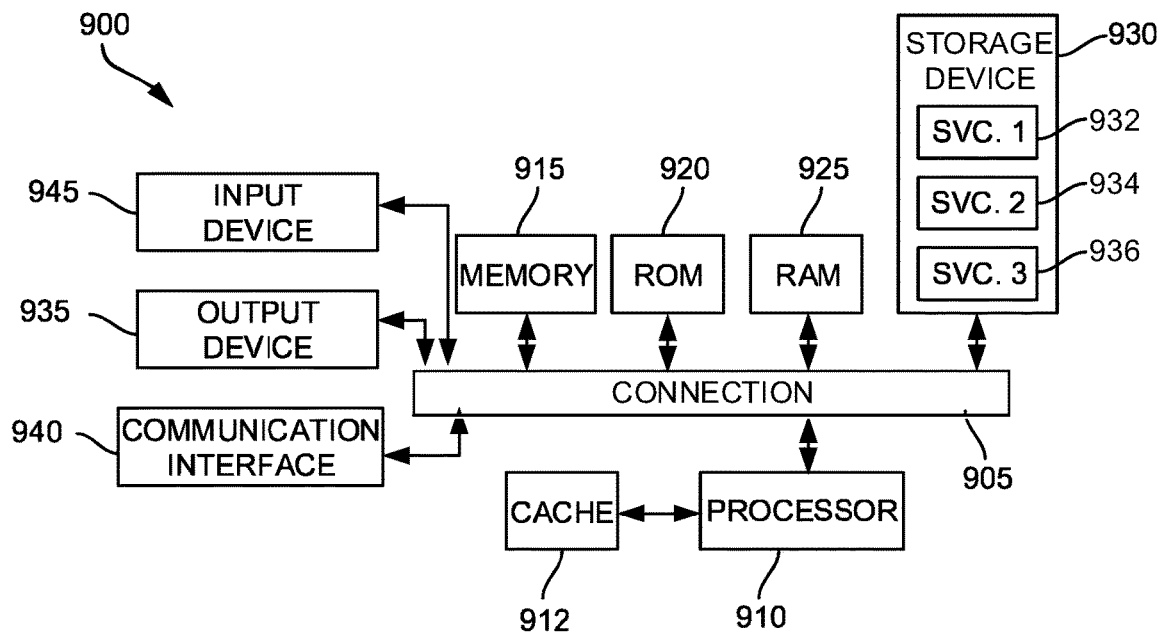
FIGS. 9A and 9B illustrate examples of systems according to example aspects of the present disclosure.

FIG. 9A illustrates an example architecture for a conventional bus computing system 900 for implementing the various systems described above. The components of the system 900 are in electrical communication with each other using a system bus 905. The computing system 900 can include a processing unit (CPU or processor) 910 and the system bus 905 that may couple various system components including the system memory 915, such as read only memory (ROM) in a storage device 970 and random access memory (RAM) 975, to the processor 910. The computing system 900 can include a cache 912 of high-speed memory connected directly with, in close proximity to, or integrated as part of the processor 910. The computing system 900 can copy data from the system memory 915 and/or the storage device 930 to the cache 912 for quick access by the processor 910. In this way, the cache 912 can provide a performance boost that avoids processor delays while waiting for data. These and other modules can control or be configured to control the processor 910 to perform various actions. Other system memory 915 may be available for use as well. The system memory 915 can include multiple different types of memory with different performance characteristics. The processor 910 can include any general purpose processor and a hardware module or software module, such as module 1 932, module 2 934, and module 3 938 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

Storage device 930 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, the system bus 905, output device 935, and so forth, to carry out the function.

Figure 9B:
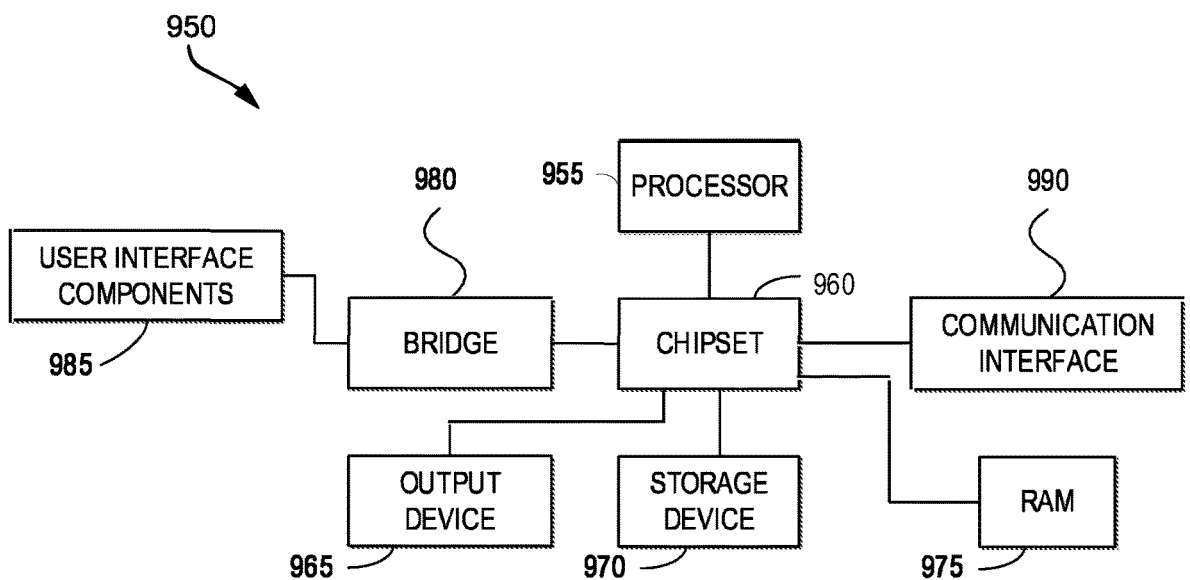

FIG. 9B illustrates an example architecture for a conventional chipset computing system 950 for implementing the various above-described aspects. The conventional chipset computing system 950 can include a processor 955, representative of any number of physically and/or logically distinct resources capable of executing software, firmware, and hardware configured to perform identified computations. The processor 955 can communicate with a chipset 960 that can control input to and output from the processor 955. In this example, the chipset 960 can output information to an output device 965, such as a display, and can read and write information to storage device 970, which can include magnetic media, and solid state media, for example. The chipset 960 can also read data from and write data to RAM 975. A bridge 980 for interfacing with a variety of user interface components 985 can be provided for interfacing with the chipset 960. The user interface components 985 can include a keyboard, a microphone, touch detection and processing circuitry, a pointing device, such as a mouse, and so on. Inputs to the conventional chipset computing system 950 can come from any of a variety of sources, machine generated and/or human generated.

The chipset 960 can also interface with one or more communication interfaces 990 that can have different physical interfaces. The communication interfaces 990 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 955 analyzing data stored in the storage device 970 or the RAM 975. Further, the computing system 900 can receive inputs from a user via the user interface components 985 and execute appropriate functions, such as browsing functions by interpreting these inputs using the processor 955.

It will be appreciated that computing systems 900 and the conventional chipset computing system 950 can have more than one processor 910 and 955, respectively, or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   interfacing a communication system with a network for communicating Wi-Fi traffic and cellular network traffic, the communication system integrating a Wi-Fi Access Point (AP) and a cellular network Radio Unit (RU), the cellular network RU configured to connect to the Wi-Fi AP;
   processing the Wi-Fi traffic and the cellular network traffic via the communication system;
   interfacing the communication system with at least one programmable Radio Frequency (RF) front end configured for wireless communication over one or more frequency bands for the Wi-Fi traffic and one or more frequency bands for the cellular network traffic; and
   synchronizing the cellular network RU to the Wi-Fi AP via a module interface.

2. The method of claim 1, wherein the communication system integrating the Wi-Fi AP and the cellular network RU comprises a system on a chip (SoC), the SoC comprising:
   a Wi-Fi Media Access Controller (MAC) for processing the Wi-Fi traffic; and
   a traffic multiplexer in communication with the network, the traffic multiplexer for routing the Wi-Fi traffic to the Wi-Fi MAC and the cellular network traffic to the cellular network RU.

3. The method of claim 1, wherein the at least one programmable RF front end comprises a common programmable RF front end module for routing the Wi-Fi traffic for wireless communication from a Wi-Fi Media Access Controller (MAC) and the cellular traffic for wireless communication from the cellular network RU.

4. The method of claim 1, wherein the Wi-Fi AP further comprises a Wi-Fi Media Access Controller (MAC) for processing the Wi-Fi traffic.

5. The method of claim 4, wherein the Wi-Fi AP further comprises:
   a traffic multiplexer for routing the Wi-Fi traffic to the Wi-Fi MAC and the cellular network traffic to the cellular network RU.

6. The method of claim 4, wherein the Wi-Fi AP further comprises the at least one programmable RF front end, the at least one programmable RF front end being configured to route the Wi-Fi traffic for wireless communication from the Wi-Fi MAC and the cellular traffic for wireless communication from the cellular network RU, and wherein the cellular network RU further comprises a cellular RF front end for routing the cellular traffic for wireless communication.

7. The method of claim 1, wherein the cellular network RU further comprises a cellular RF front end for routing the cellular traffic for wireless communication.

8. The method of claim 1, wherein the communication system integrating the Wi-Fi AP and the cellular network RU comprises a system on a chip (SoC), the SoC integrating a Wi-Fi Media Access Controller (MAC) for processing the Wi-Fi traffic with a cellular RU Media Access Controller (MAC) for processing the cellular network traffic.

9. The method of claim 1, wherein the cellular network traffic comprises one or more of 4G, Long Term Evolution (LTE), or 5G New Radio (NR) traffic.

10. The method of claim 1, wherein the Wi-Fi AP comprises one or more registers for storing timestamps, the timestamps are associated an IEEE 1588 Precision Timing Protocol (PTP), and wherein the cellular network RU comprises a precision oscillator for accessing the one or more registers.

11. A system comprising:
    one or more processors; and
    at least one memory containing instructions which, when executed on the one or more processors, cause the one or more processors to:
    interface a communication system with a network for communicating Wi-Fi traffic and cellular network traffic, the communication system integrating a Wi-Fi Access Point (AP) and a cellular network Radio Unit (RU), the cellular network RU configured to connect to the Wi-Fi AP;
    process the Wi-Fi traffic and the cellular network traffic via the communication system;
    interface the communication system with at least one programmable Radio Frequency (RF) front end configured for wireless communication over one or more frequency bands for the Wi-Fi traffic and one or more frequency bands for the cellular network traffic; and
    synchronize the cellular network RU to the Wi-Fi AP via a module interface.

12. The system of claim 11, wherein the at least one programmable RF front end comprises a common programmable RF front end module for routing the Wi-Fi traffic for wireless communication from a Wi-Fi Media Access Controller (MAC) and the cellular traffic for wireless communication from the cellular network RU.

13. The system of claim 11, wherein the Wi-Fi AP further comprises a Wi-Fi Media Access Controller (MAC) for processing the Wi-Fi traffic.

14. The system of claim 13, wherein the Wi-Fi AP further comprises the at least one programmable RF front end, the at least one programmable RF front end being configured to route the Wi-Fi traffic for wireless communication from the Wi-Fi MAC and the cellular traffic for wireless communication from the cellular network RU, and wherein the cellular network RU further comprises a cellular RF front end for routing the cellular traffic for wireless communication.

15. The system of claim 11, wherein the communication system integrating the Wi-Fi AP and the cellular network RU comprises a system on a chip (SoC), the SoC integrating a Wi-Fi Media Access Controller (MAC) for processing the Wi-Fi traffic with a cellular RU Media Access Controller (MAC) for processing the cellular network traffic.

16. The system of claim 11, wherein the cellular network traffic comprises one or more of 4G, Long Term Evolution (LTE), or 5G New Radio (NR) traffic.

17. The system of claim 11, wherein the Wi-Fi AP comprises one or more registers for storing timestamps, the timestamps are associated an IEEE 1588 Precision Timing Protocol (PTP), and wherein the cellular network RU comprises a precision oscillator for accessing the one or more registers.

18. At least one non-transitory machine-readable storage medium, containing instructions which, when executed by one or more processors, cause the one or more processors to:

interface a communication system with a network for communicating Wi-Fi traffic and cellular network traffic, the communication system integrating a Wi-Fi Access Point (AP) and a cellular network Radio Unit (RU), the cellular network RU configured to connect to the Wi-Fi AP;

process the Wi-Fi traffic and the cellular network traffic via the communication system;

interface the communication system with at least one programmable Radio Frequency (RF) front end configured for wireless communication over one or more frequency bands for the Wi-Fi traffic and one or more frequency bands for the cellular network traffic; and synchronize the cellular network RU to the Wi-Fi AP via a module interface.

19. The at least one non-transitory machine-readable storage medium of claim 18, wherein the communication system integrating the Wi-Fi AP and the cellular network RU comprises a system on a chip (SoC), the SoC integrating a Wi-Fi Media Access Controller (MAC) for processing the Wi-Fi traffic with a cellular RU Media Access Controller (MAC) for processing the cellular network traffic.

20. The at least one non-transitory machine-readable storage medium of claim 18, wherein the cellular network traffic comprises one or more of 4G, Long Term Evolution (LTE), or 5G New Radio (NR) traffic.

* * * * *